E. R. CARICHOFF.
MOTOR CONTROL.
APPLICATION FILED APR. 27, 1908.

964,751.

Patented July 19, 1910.
2 SHEETS—SHEET 1.

Witnesses:
George H. Tilden
J. Ellis Glen

Inventor:
Eugene R. Carichoff,
by Albert G. Davis
Att'y.

E. R. CARICHOFF.
MOTOR CONTROL.
APPLICATION FILED APR. 27, 1908.

964,751.

Patented July 19, 1910.
2 SHEETS—SHEET 2.

Witnesses:
George H. Tilden
J. Ellis Glen

Inventor:
Eugene R. Carichoff,
by Albert G. Davis
Att'y.

UNITED STATES PATENT OFFICE.

EUGENE R. CARICHOFF, OF SCHENECTADY, NEW YORK, ASSIGNOR TO GENERAL ELECTRIC COMPANY, A CORPORATION OF NEW YORK.

MOTOR CONTROL.

964,751.  Specification of Letters Patent.  Patented July 19, 1910.

Application filed April 27, 1908. Serial No. 429,320.

*To all whom it may concern:*

Be it known that I, EUGENE R. CARICHOFF, a citizen of the United States, residing at Schenectady, county of Schenectady, State of New York, have invented certain new and useful Improvements in Motor Control, of which the following is a specification.

My invention relates to the control of electric motors, and its object is to provide a control system having certain novel and advantageous features.

One feature of my invention consists in providing a main switch by which the motor circuit is always opened and closed, a circuit-changing switch, a single actuating-magnet for operating both the main switch and the circuit-changing switch, a selective-magnet for controlling the action of the actuating-magnet on the circuit-changing switch, and a master-controller for controlling both magnets.

My invention further comprises the control of the main actuating-magnet by contacts controlled by the selective-magnet, so that the main actuating-magnet is not energized to close the main switch and to move the circuit-changing switch, until the selective means controlled by the selective-magnet is in the proper position.

Another feature of my invention relates to the resistance-controlling device for varying the resistance in the motor circuit. For this purpose I provide a resistance, a plurality of separated contact blocks movably supported and connected to different points on the resistance and serving as contacts therefor, and a movable member adapted to short-circuit the resistance step-by-step by engaging and moving the contact blocks successively. I further provide suitable retarding means for the movable member, so that the desired time-interval is obtained between the cutting out of successive resistance steps. A device of this kind is not well adapted for opening the circuit. I, therefore, provide a maintaining circuit for the actuating means for this resistance device, which maintaining circuit is controlled by the main switch, heretofore mentioned; so that after the resistance has been cut out of circuit, it is not again cut in until after the main switch has opened.

My invention will best be understood by reference to the accompanying drawings, in which—

Figure 1:
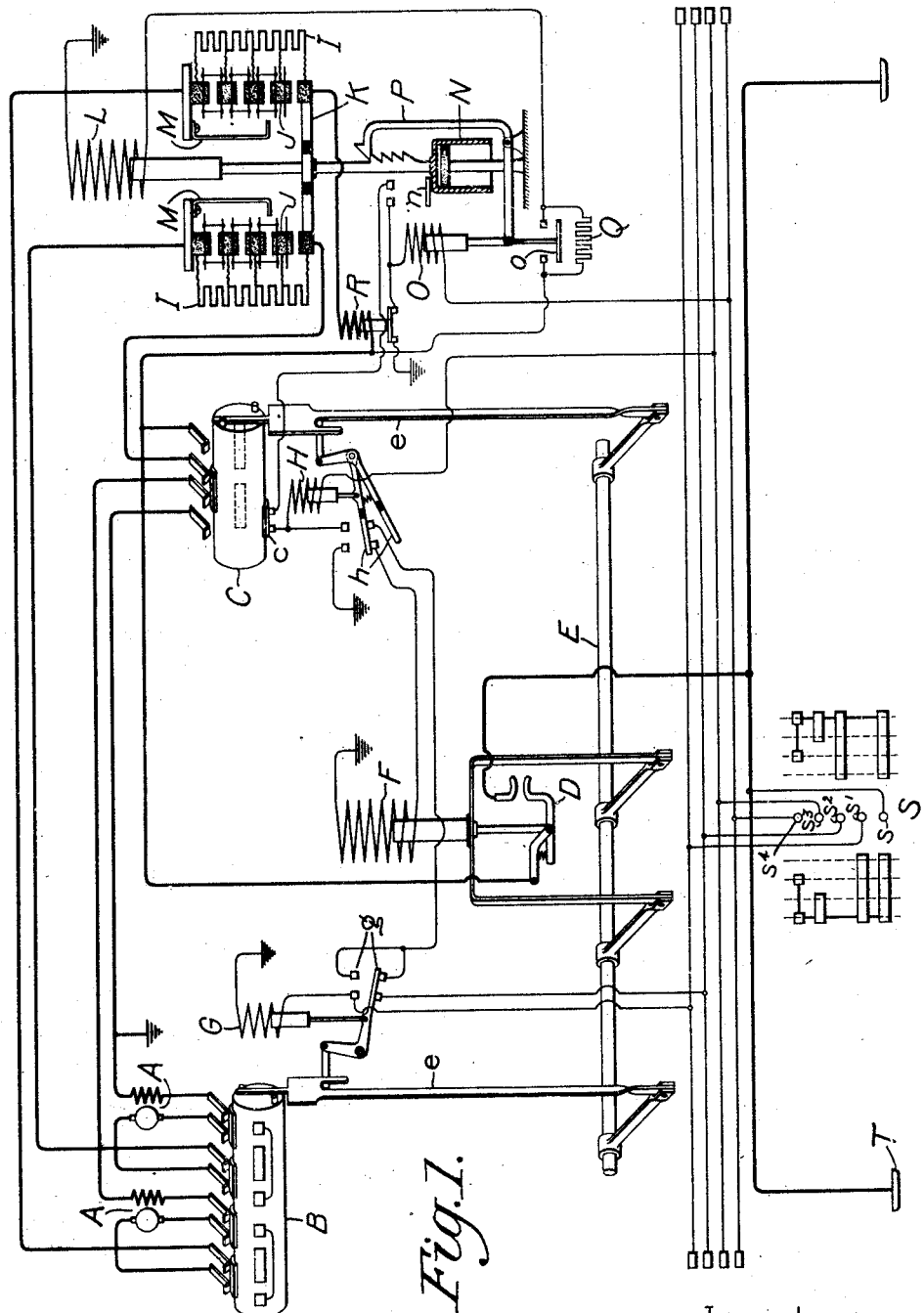
Figure 2:
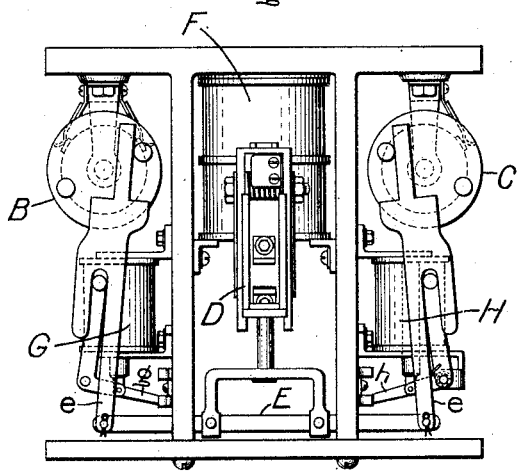
Figure 3:
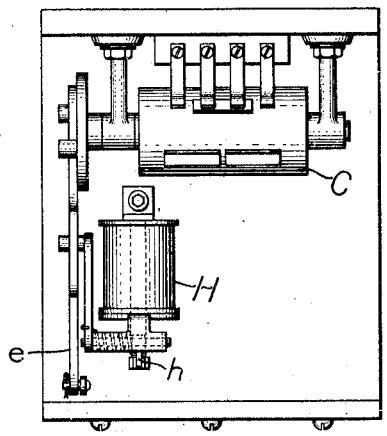
Figure 4:
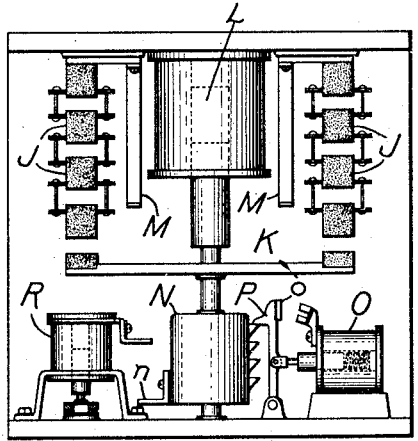
Figure 5:
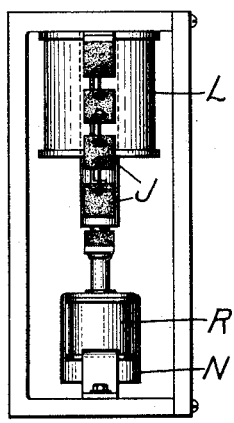
Figure 6:
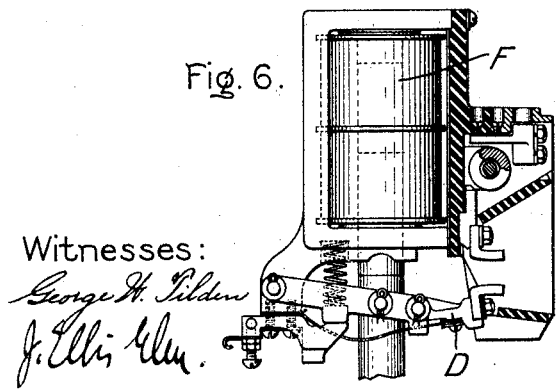

Figure 1 shows diagrammatically a motor control system arranged in accordance with my invention, Figs. 2 and 3 are views showing the structure of the main switch, the circuit-changing switches and their actuating and controlling magnets, Figs. 4 and 5 are views showing the structure of the resistance-controlling device; and Fig. 6 shows the construction of the main switch.

In the drawings, A A represent a pair of motors to be controlled.

B represents a reversing switch, and C a series-parallel switch in the motor circuit. These two circuit-changing switches, which I have indicated as of the drum type, may be of any suitable construction.

D represents what I term the "main switch". It is at this switch that the motor circuit is always opened and closed.

E represents an actuating member for shifting both the reversing switch B and series-parallel switch C. This actuating member E and the main switch D are both operated by a main actuating-magnet F.

G and H represent selective-magnets which control the action of switches B and C, respectively, of the actuating member E. The cores of these selective-magnets are suitably connected to links $e$ $e$ connected to the actuating member E E, so that the movement of the core, when the selective-magnet is energized or deënergized, shifts the link $e$ into position to engage one or the other of the pins on the end of the switch B or C. Thus, when the member E is moved, the switches B and C are shifted into one position or the other, according as the magnets G and H are energized or deënergized. These magnets are provided with contacts $g$ and $h$, which control the main actuating magnet F, as will hereinafter be explained.

I I represent a pair of resistances in the motor circuit.

J J represent contact blocks of carbon or other suitable material, which are freely suspended one above the other, and connected to points on the resistances I I, as shown. These contact blocks, are normally separated and insulated from each other, but when the member K is moved upward, it raises each contact block successively into engagement with the one just above it, so as to short-circuit step-by-step the resistance I. The blocks are heavy enough to make good contact. The member K is lifted by an actuating-magnet L. In its upper position, the member K engages contacts M M short-circuiting the carbon blocks and resistances. To retard the upward movement of the member K, and consequently to give a suitable interval between the short-circuiting of the several resistance steps, a dash-pot N is provided.

O represents a magnet, the core of which is connected to a hook or latch P, which, when magnet O is deënergized, locks the member K against movement. The magnet O further controls the operation of the resistance device by a contact o, which, when the magnet O is energized, short-circuits a resistance Q in series with the actuating magnet L. This resistance, when in circuit with magnet L, is of sufficient amount to prevent the magnet from drawing up its core, but is not so great but that the core, when raised, will be held raised, although the resistance is again cut into circuit. The circuit of magnet L and resistance Q extends through the main switch D, so that after the core of magnet L is once raised, it will not drop until the main switch D is opened, so the contacts J are never required to break the circuit.

R represents a throttle relay, the winding of which is in the motor-circuit, and the contacts of which are in series with the circuit of magnet winding O. Whenever the motor-current rises above a certain amount, the contacts of relay R are opened, thereby deënergizing magnet O, which cuts the resistance Q into circuit with winding L, and allows the latch P to engage the member K, so as to prevent further upward movement of this member until the motor current falls below the desired limit.

S represents a master-switch for controlling the several magnets of the system. This switch is shown diagrammatically, with its contacts developed on a plane surface.

Five stationary contacts $s$ to $s^4$ are shown, and two sets of movable contacts for controlling the motors for opposite directions of rotation.

T represents a third-rail shoe, or other current-collector, for the system.

The parts are shown in the positions occupied when the master-switch S is in off-position. The motor circuit is open at main switch D, and resistances I are all included in the motor circuit. If master-switch S is moved so as to bring the right-hand movable contacts into engagement with the contact-fingers, a circuit is closed from collector T through contacts $s$ and $s^2$, back-contacts, contact $g$, lower contacts $h$, actuating magnet F, to ground. The actuating magnet consequently closes the main switch D thereby closing the motor-circuit and throwing the series-parallel switch C to series position, unless it is already in that position, in which case it is not moved. If, on the other hand, the left-hand movable contacts are brought into engagement with the stationary contact-fingers, the current-collector T is connected to contact-finger $s^1$, instead of contact-finger $s^2$, so that the actuating magnet F is not energized until after selective-magnet G has drawn up its core, so that when the magnet F pulls up its core, the reversing switch B will be thrown to its other position. In either case, the series-parallel switch C is not moved, unless it was initially in parallel position, since the selective-magnet H remains deënergized.

The main switch D having been closed, and the reversing switch being in one position or the other, according to the direction of movement of the main switch S, a further movement of the master-switch to its second position establishes a circuit from the current-collector T, through contacts $s$ and $s^4$ magnet winding O and contacts of throttle-relay R, to ground. Magnet O is consequently energized, and draws up its core, shifting latch P out of engaging position, and short-circuiting resistance Q, so that actuating-magnet L is connected directly to the current-collector T through main switch D. Magnet L consequently draws up its core, short-circuiting resistances I step-by-step. If the retarding effect of dash-pot N is not sufficient to prevent the motor-current from being increased too readily, throttle-relay R opens its contacts, deënergizing magnet O, which cuts resistance Q into circuit and restores latch P to locking position. Thus, the upward movement of member K is arrested until the motor-current falls below the desired limit. When member K reaches its extreme upper position, engaging contacts M M and thereby short-circuiting resistance I I and contact-blocks J, a contact $n$ carried by dash-pot N closes, so that if now the movement of master-switch S be continued to bring it to its third position, a circuit is closed from current-collector T through contacts $s$ and $s^3$, selective-magnet H, contacts $c$ on series-parallel switch C, contact $m$ and contact of throttle-relay R, to ground. Selective-magnet H is consequently energized. The upward movement of its core first opens the circuit of actuating-magnet F, allowing actuating-member E to fall and main switch D to open, thereby opening the motor-circuit. The continued upward movement of the core of magnet H shifts link $e$ to its other position to engage the right-hand pin of series-parallel switch C and then closes two circuits. The first circuit which is closed through the upper contact $h$ is a maintaining circuit for itself, while the circuit closed through the lower contact $h$ reënergizes actuating magnet F. The dropping of main switch D has already deënergized magnet L, so that resistances I I have again been cut into circuit. Consequently, when magnet F is again energized by the lower contact $h$, actuating member E throws switch C into its parallel position and closes the motor circuit at the main switch D. The motors are thus in parallel with resistances I I in circuit. A further movement of the master-switch S to its fourth and last position again energizes magnet O, and causes magnet L again to short-circuit the resistances I I.

Suitable constructions for the several parts of the apparatus are shown in Figs. 2 to 6. In Figs. 2 and 3 is shown the main actuating-magnet F controlling the main switch D and the actuating member E. The selective-magnets G and H, controlling the links $e$ $e$ are also shown, and their effect on the movement of switches B and C is clearly indicated. The construction of the magnet L, the contact blocks J, the latch P, magnet O, throttle-relay R and contact $n$ are all clearly shown in Figs. 4 and 5, and need no further description. The construction of main switch D, shown in Fig. 6, is a well known construction, and needs no detailed description.

I do not desire to limit myself to the particular construction and arrangement of parts here shown, but aim in the appended claims to cover all modifications which are within the scope of my invention.

What I claim as new and desire to secure by Letters Patent of the United States, is,

1. In a system of motor control, a main switch for opening and closing the motor circuit, a circuit-changing switch, an actuating member for the latter switch, a single magnet for operating both said main switch and said actuating member, a selective magnet controlling the effect of said member on said circuit-changing switch, and a master-switch controlling both of said magnets.

2. In a system of motor control, a main switch for opening and closing the motor circuit, a plurality of circuit-changing switches, a common actuating member for the latter switches, a single magnet for operating both said main switch and said actuating member, a plurality of selective-magnets controlling the effect of said actuating member on the several circuit-changing switches, and a master-switch controlling all of said magnets.

3. In a system of motor control, a main switch for opening and closing the motor circuit, a circuit-changing switch, an actuating member for the latter switch, a single magnet for operating both said main switch and said actuating member, a selective-magnet controlling the effect of said member on said circuit-changing switch, a master-switch controlling both of said magnets, and contacts controlled by said selective-magnet controlling the first mentioned magnet.

4. In a system of motor control, a main switch for opening and closing the motor circuit, a plurality of circuit-changing switches, a common actuating member for the latter switches, a single magnet for operating both said main switch and said actuating member, a plurality of selective-magnets controlling the effect of said actuating member on the several circuit-changing switches, a master-switch controlling all of said magnets, and contacts controlled by each of said selective-magnets controlling the first-mentioned magnet.

5. In a control system, a resistance-controlling device comprising a resistance, a plurality of separated contact blocks movably suspended one from another and connected to different points on said resistance, and a movable member adapted to short-circuit said resistance step-by-step by engaging and moving said blocks successively.

6. In a control system, a resistance controlling device comprising a resistance, a plurality of separated contact blocks movably suspended one from another and connected to different points on said resistance, a movable member adapted to short-circuit said resistance step-by-step by engaging and moving said blocks successively, an actuating magnet for moving said member, and retarding means therefor.

7. In a control system, a resistance controlling device comprising a resistance, a plurality of separated contact blocks movably suspended one from another and one above the other, and connected to different points on said resistance, a movable member adapted to short-circuit said resistance step-by-step by lifting each of said contact blocks successively into engagement with the one directly above it, an actuating magnet for moving said member, and retarding means therefor.

8. In a control system, a resistance controlling device comprising a resistance, a plurality of separated movable members connected to a plurality of different points on said resistance and serving as contacts therefor, a movable member adapted to short-circuit said resistance step-by-step by engaging and moving said members successively, an actuating-magnet for moving said member, a main switch for opening and closing the motor circuit, and a maintaining circuit for said magnet controlled by said main switch.

9. In a control system, a resistance controlling device comprising a resistance, a plurality of separated contact blocks movably suspended and connected to different points on said resistance, a movable member adapted to short-circuit said resistance step-by-step by engaging and moving said blocks successively, an actuating magnet for moving said member, a main switch for opening and closing the motor circuit, and a maintaining circuit for said magnet controlled by said main switch.

10. In a motor control system, a resistance in the motor circuit, means for cutting said resistance out of circuit step-by-step, an actuating magnet for said means, a resistance in series with said actuating magnet, a control-magnet arranged to short-circuit said resistance to control said actuating magnet, a master-switch, and a magnet in the motor circuit jointly with said master-switch controlling said control-magnet.

11. In a motor control system, a resistance in the motor circuit, means for cutting said resistance out of circuit step-by-step, an actuating magnet for said means, a control-magnet controlling the circuit of said actuating magnet, and a latch for arresting the movement of said means controlled by said control-magnet.

12. In a motor control system, a resistance in the motor circuit, means for cutting said resistance out of circuit step-by-step, an actuating magnet for said means, a control-magnet controlling the circuit of said actuating magnet, a latch for arresting the movement of said means controlled by said controlling magnet, and a magnet in the motor circuit controlling said control-magnet.

13. In a motor control system, a resistance in the motor circuit, means for cutting said resistance step-by-step out of circuit, an actuating magnet for said means, a resistance in circuit with said actuating magnet, a control-magnet arranged to cut the last-mentioned resistance into and out of circuit, a latch arranged to arrest the movement of said means controlled by said control-magnet, and a magnet in the motor circuit controlling said control magnet.

In witness whereof, I have hereunto set my hand this 25th day of April, 1908.

EUGENE R. CARICHOFF.

Witnesses:
BENJAMIN B. HULL,
HELEN ORFORD.